UNITED STATES PATENT OFFICE 2,429,096

PYRIDINE-2-THIOL AND 2,2'-DITHIO-DIPYRIDINE AS FUNGICIDES

Elbert C. Ladd, Passaic, N. J., assignor to United States Rubber Company, New York, N. Y., a corporation of New Jersey No Drawing. Application February 9, 1945, Serial No. 577,130

18 Claims. (Cl. 167—33)

This invention relates to new and useful improvements in pyridine-2-thiol and 2,2'-dithiodipyridine as fungicides. The invention further relates to methods of treating plants, and to methods of protecting organic material subject to attack by fungi, as the immunizing of seed, and the mildewproofing of fabrics and other material.

I have found that pyridine-2-thiol, its salts, and the corresponding disulfide, that is, 2,2'-dithiodipyridine, are effective fungicides. The structures of the thiol, the zinc salt which is the preferred salt, and the disulfide, may be represented as follows:

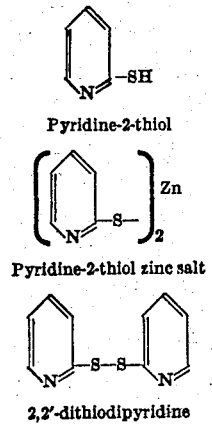

Pyridine-2-thiol

Pyridine-2-thiol zinc salt 2,2'-dithiodipyridine

The pyridine-2-thiol and 2,2'-dithiodipyridine and the methods of preparation are described by Markwald et al., Beilstein, 4th ed., 21, 45. The zinc salt of pyridine-2-thiol may be prepared by mixing an aqueous alkaline (KOH) solution of pyridine-2-thiol with a 10% aqueous solution of zinc nitrate, filtering the precipitated zinc salt, washing and drying.

The compounds may be used as seed protectants, and to protect plants, which term includes plant parts, or soil from microorganisms harmful to seeds and plants. They may also be applied to prevent or retard fungus growth and the formation of, for example, mildew on organic material such as rope, wood, fur, hair, feathers, cotton, wool, leather, paints, varnishes and the like. They may be applied as a dust, undiluted or mixed with a powdered solid carrier, such as clay or talc, or as a liquid or a spray in a liquid carrier, as in solution in a suitable solvent, or suspended in a suitable non-solvent, for example, water. Preferably when applied from suspension in a liquid carrier, the composition contains a dispersing agent for the chemicals. They may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compounds may be used admixed with carriers that are active of themselves, for example, other fungicides, or bactericides, insecticides, insectifuges, fertilizers, hormones, buffering or softening agents.

The following examples are given to illustrate the invention:

Example I

Pea seed (variety Perfection) were tumbled with 1% by weight of pyridine-2-thiol in dust form. The seeds were then planted in greenhouse soil known to be infested with a number of organisms including *Pythium ultimum*. An equivalent number of untreated seeds were planted under similar conditions. Observations made at the end of ten days showed that 89% of the treated seed had germinated, whereas only 46% of the untreated seed had germinated.

Example II

The toxicity of the chemicals of the invention to the spores of the fungus *Sclerotinia fructicola* was measured according to the methods described by S. E. A. McCallan et al. in Contribution Boyce Thompson Institute, 4, 233 (1932); 9, 249 (1938); 10, 329 (1939); 12, 49 (1941); 12, 431 (1942). In these tests the chemicals were suspended in finely ground form in water containing a small amount of commercial dispersing agent which was not toxic to the fungus. Concentrations of 5, 50, 500 and 5000 parts per million (P. P. M.) of the various chemicals were tested using the "slide technique" described in the above references. The lowest concentration of the chemical that gave 100% kill of the fungus, that is, completely prevented spore germination, is shown in the following table:

| Chemical | Dosage (P. P. M.) for 0% Spore Germination |
|---|---|
| Pyridine-2-thiol | 50 |
| 2,2'-dithiodipyridine | 50 |
| Pyridine-2-thiol zinc salt | 500 |

Example III

A piece of 8-ounce cotton fabric was immersed in a 1% solution (by weight) of pyridine-2-thiol in acetone until the fabric was completely impregnated with the solution. Thereafter it was removed from the solution and air dried to completely remove the acetone. The piece was then inoculated with Chaetomium globosum spore suspension and incubated for 30 days. A piece of cotton fabric treated with acetone only and dried (check) was inoculated with Chaetomium globosum spore suspension and incubated at the same time. At the end of the incubation period it was observed that the material treated with pyridine-2-thiol was free of fungus growth whereas the untreated check piece was heavily overgrown with fungus.

*Example IV*

A piece of 8-ounce cotton fabric was immersed in a 1% (by weight) dispersion of zinc salt of pyridine-2-thiol in water containing .005% of Nacconol NR, a preparatory dispersing agent which is a sulfonated condensation product of chlorinated kerosene with benzene, and dried. A portion of the thus treated cotton fabric was leached with running water for 24 hours and dried. A piece of the original untreated cotton fabric was treated with water containing only .005% of the Nacconol NR and dried. The three pieces were inoculated and incubated as in Example III. At the end of the 30 day incubation period, it was observed that the two pieces of fabric treated with the pyridine-2-thiol zinc salt, one of which was subsequently leached in water and the other not so leached, were free of fungus growth, whereas the fabric treated only with the water containing the Nacconol NR was heavily overgrown with fungus.

In treatment by impregnation methods, for example, in the mildewproofing of wood, cotton textiles, leather and the like, where it is desired that the final deposit be a heavy metal salt of the pyridine-2-thiol, a two bath impregnation system may be used to deposit the salt in situ. Thus one bath may be an aqueous bath containing the pyridine-2-thiol, or a water soluble salt thereof, and the other bath may be an aqueous bath containing a soluble salt of the appropriate heavy metal.

Having thus described my invention, what I claim and desire to protect by Letters Patent is:

1. A fungicidal composition comprising as an active ingredient material selected from the group consisting of pyridine-2-thiol, its salts, and 2,2'-dithiodipyridine and a carrier therefor selected from the group consisting of clay and talc, and water containing a dispersing agent.

2. A fungicidal composition comprising a powdered solid carrier and as an active ingredient material selected from the group consisting of pyridine-2-thiol, its salts, and 2,2'-dithiodipyridine.

3. A fungicidal composition comprising an aqueous suspension of material selected from the group consisting of pyridine-2-thiol, its salts, and 2,2'-dithiodipyridine, said aqueous suspension containing a dispersing agent.

4. A fungicidal composition comprising an aqueous suspension of pyridine-2-thiol, said aqueous suspension containing a dispersing agent.

5. A fungicidal composition comprising a powdered solid carrier and pyridine-2-thiol as an active ingredient.

6. A fungicidal composition comprising an aqueous suspension of the zinc salt of pyridine-2-thiol, said aqueous suspension containing a dispersing agent.

7. A fungicidal composition comprising an aqueous suspension of 2,2'-dithiodipyridine, said aqueous suspension containing a dispersing agent.

8. The method of protecting organic material susceptible to attack by microorganisms which comprises treating said organic material with material selected from the group consisting of pyridine-2-thiol, its salts, and 2,2'-dithiodipyridine.

9. The method of protecting organic material susceptible to attack by microorganisms which comprises treating said organic material with pyridine-2-thiol.

10. The method of controlling fungi on plants which comprises treating plants with material selected from the group consisting of pyridine-2-thiol, its salts, and 2,2'-dithiodipyridine.

11. The method of protecting seeds, plants and soil subject to attack or infestation by fungi which comprises treating said material with material selected from the group consisting of pyridine-2-thiol, its salts, and 2,2'-dithiodipyridine.

12. The method of protecting seeds, plants and soil subject to attack or infestation by fungi which comprises treating said material with pyridine-2-thiol.

13. The method of immunizing seed which comprises treating said seed with material selected from the group consisting of pyridine-2-thiol, its salts, and 2,2'-dithiodipyridine.

14. The method of immunizing seed which comprises treating said seed with pyridine-2-thiol.

15. The method of controlling fungi on living organisms which comprises treating said organisms with material selected from the group consisting of pyridine-2-thiol, its salts, and 2,2'-dithiodipyridine.

16. The method of destroying fungus which comprises subjecting said fungus to the action of material selected from the group consisting of pyridine-2-thiol, its salts, and 2,2'-dithiodipyridine.

17. The method of controlling mildew on organic material susceptible to attack by mildew which comprises treating said organic material with material selected from the group consisting of pyridine-2-thiol, its salts, and 2,2'-dithiodipyridine.

18. The method of controlling mildew on organic material susceptible to attack by mildew which comprises treating said organic material with pyridine-2-thiol.

ELBERT C. LADD.

REFERENCES CITED

The following references are of record in the file of this patent:

Beilstein, 4th edition, 1934, volume 21, page 45.